United States Patent
Wang (10) Patent No.: US 11,920,699 B2
(45) Date of Patent: Mar. 5, 2024

(54) HIGH PRESSURE AUTO DRAIN BALL VALVE

(71) Applicant: Intech Industries, Inc., Wauconda, IL (US)

(72) Inventor: Hongjun Wang, Jiangsu (CN)

(73) Assignee: Intech Industries, Inc., Wauconda, IL (US)

( * ) Notice: Subject to any disclaimer, the term of this patent is extended or adjusted under 35 U.S.C. 154(b) by 278 days.

(21) Appl. No.: 17/532,621

(22) Filed: Nov. 22, 2021

(65) Prior Publication Data

US 2022/0154832 A1    May 19, 2022

Related U.S. Application Data

(63) Continuation-in-part of application No. 17/469,240, filed on Sep. 8, 2021, now abandoned.

(30) Foreign Application Priority Data

Sep. 8, 2020 (CN) .............................. 202021942834

(51) Int. Cl.
    *F16K 5/20* (2006.01)
    *F16K 5/06* (2006.01)
    *F16K 27/06* (2006.01)

(52) U.S. Cl.
    CPC ............ *F16K 5/201* (2013.01); *F16K 5/0605* (2013.01); *F16K 27/067* (2013.01)

(58) Field of Classification Search
    CPC ...... F16K 27/07; F16K 27/042; F16K 27/067; F16K 5/201; F16K 5/0605; F16K 39/06
    See application file for complete search history.

(56) References Cited

U.S. PATENT DOCUMENTS

| | | | | |
|---|---|---|---|---|
| 2,239,795 A | * | 4/1941 | Parker | F16K 39/06 251/283 |
| 2,573,238 A | * | 10/1951 | Wunn | F16K 39/06 137/246.22 |
| 3,209,779 A | * | 10/1965 | McGowen, Jr. | F16K 5/0605 138/44 |

(Continued)

FOREIGN PATENT DOCUMENTS

| CN | 2506827 Y | 8/2002 | ............... F16K 5/20 |
|---|---|---|---|
| CN | 105221784 | 6/2016 | ............... F16K 5/06 |

(Continued)

OTHER PUBLICATIONS

KR 101009140 B1, Machine Translation (Year: 2011).*

*Primary Examiner* — Daphne M Barry
(74) *Attorney, Agent, or Firm* — Niro McAndrews, LLP (57) ABSTRACT

Disclosed is ball valve with automatic safety exhaust function, which is suitable for working environments in high pressure applications, such as up to 600 psi of water, oil, and gas. The ball valve includes a valve body, cap, ball with a vent hole, stem, a built-in vent needle valve, and seals. When the valve is in the closed position, the built-in needle valve is in the open state. The downstream gas enters the bottom of the valve cavity from the exhaust hole on the ball and exits the valve body through the needle valve hole. When the ball valve is in the open position, the built-in needle valve is in the closed state. The built-in needle valve design ensures that under high-pressure use (open state), the gas will not leak out of the valve body.

22 Claims, 10 Drawing Sheets

(56) References Cited

U.S. PATENT DOCUMENTS

| | | | | |
|---|---|---|---|---|
| 3,424,190 | A | * 1/1969 | Wolfensperger | F16K 5/20 251/315.08 |
| 3,656,498 | A | 4/1972 | Grove | F16K 5/06 |
| 4,548,237 | A | 10/1985 | Bogenschutz | F16K 5/06 |
| 4,577,662 | A | 3/1986 | Doremus | 137/630.14 |
| 4,614,330 | A | * 9/1986 | Kalsi | F16K 5/16 251/283 |
| 4,749,002 | A | 6/1988 | Lembser | F16K 5/06 |
| 4,848,401 | A | * 7/1989 | Devilleger | E21B 34/02 137/601.19 |
| 5,255,706 | A | 10/1993 | Chudakov | |
| 5,632,294 | A | 5/1997 | Benton | F16K 5/06 |
| 6,220,290 | B1 | 4/2001 | Lomax | F16K 5/06 |
| 6,832,621 | B1 | 12/2004 | Williams | 137/239 |
| 7,089,960 | B2 | 8/2006 | Maruta | B62D 5/083 |
| 8,881,767 | B2 | 11/2014 | Bartell | F16K 5/06 |
| 9,334,966 | B2 | 5/2016 | Lehman | F16K 17/40 |
| 9,618,126 | B1 | 4/2017 | Lacroix | F16K 5/06 |
| 9,982,789 | B2 | 5/2018 | Mircea | F16K 5/00 |

FOREIGN PATENT DOCUMENTS

| | | | |
|---|---|---|---|
| CN | 208010963 | 10/2018 | F16K 5/06 |
| CN | 108869780 | 11/2018 | F16K 5/06 |
| CN | 212251196 | 12/2020 | F16K 1/226 |
| CN | 212899855 | 6/2021 | F16K 5/06 |
| KR | 101009140 B1 * | 1/2011 | |

* cited by examiner

HIGH PRESSURE AUTO DRAIN BALL VALVE

CROSS-REFERENCE TO CO-PENDING APPLICATION

This application is a continuation-in-part of U.S. patent application Ser. No. 17/469,240 entitled "High Pressure Auto Drain Ball Valve" that was filed on Sep. 8, 2021 by applicant Intech Industries, Inc. and claimed the benefit of Chinese patent application No. 202021942834 entitled "Linkage type self-discharge valve" that was filed on Sep. 8, 2020, by applicant Kangcheng (Jiangsu) Machinery Manufacturing Co., Ltd. and inventor Wang Hongjun, the contents of which are herein all incorporated by reference.

FIELD OF THE INVENTION

The present invention relates to a valve, in particular to a ball valve with automatic exhaust function.

BACKGROUND OF THE INVENTION

For existing automatic exhaust ball valves that are currently available, when the valve is in the fully open position (working state) and the gas pressure is greater than 200-300 PSI, leakage will occur between the ball and the ball seat as well as through the open hole at the bottom of the valve body.

Self-draining ball valves that are currently available include a valve body and a ball body that are brass. The two ends of the ball valve are threaded, and the bottom of the valve body has an exhausting hole. When the ball valve is closed, gas is exhausted from the exhausting hole at the bottom of the ball valve. The maximum working pressure of existing ball valves is 200 pounds per square inch (PSI), which excludes the usage of ball valves in higher pressure working environments. During operation of existing valves, when the ball valve is open fully, the high pressure causes deformation between the ball body and the ball seat, and the deformation will eventually lead to a liquid or gas leakage when the valve is opened. Additionally, the deformation of the ball body and the ball seat will shorten the life of the ball valve.

SUMMARY OF THE INVENTION

A linked self-draining valve is presented with an intuitive structure and an exhausting hole which can open or close automatically with the rotation of the valve ball. The design provides a sealing device to prevent leakage between the ball and the ball seat that occurs when the ball valve is in a fully open state. The design helps to relieve the pipe pressure and prolong the life of the ball valve. This design also allows the valve to operate at previously unattainable pressures, such as 600 psi.

The valve includes a needle valve at the bottom of the ball. The valve stem of the needle valve moves up and down with the rotation of the ball. When the ball (ball valve) is in a fully open state, the needle valve moves down and closes the vent. When the ball (ball valve) is in the closed state, the needle valve stem moves upward, such that the vent hole on the ball intersects with the needle valve hole to achieve the automatic vent function.

The valve includes a valve body, a valve cap, a valve ball with a flow hole, and a valve stem, wherein the valve cap is fixed to the end of the valve body to form a chamber (with two ball seats) that is used to contain the valve ball which can rotate. The valve stem is rotatably connected to the valve body, and one end is fixed to the valve ball. The valve body has a first flow hole, the valve cap has a second flow hole, and the valve body has an exhausting hole whose end is secured with a sealing valve cap where there is an exhausting hole. A valve ball hole with a central hole is formed between the sealing valve cap and the end of the exhaust hole (or relief hole), and the valve ball hole communicates with the first flow hole or the second flow hole formed in the valve ball.

A rotating shaft at the bottom of the valve ball rotates with the valve ball and is threaded with the exhaust hole or exhaust port. There is a rotating shaft exhausting hole at the outer circumference of the rotating shaft that is connected to the chamber axially. The outer periphery of the rotating shaft is provided with an axial exhaust hole communicating with the chamber.

When the valve ball is opened, the rotating shaft descends through the central hole of the sealing device and inserts into the exhausting hole of the sealing valve cap to close the exhausting hole. When the ball valve is closed, the rotating shaft rises, and the gas or liquid in the chamber can flow through the exhausting hole of the rotating shaft and flow out from the exhausting hole of the valve cap.

The valve rod may also include a handle, wherein the other end of the valve rod extends out of the valve body and is fixedly connected with the handle via a nut.

The first flow hole on the valve body and the second flow hole on the valve cap both may have internal threads.

There may also be a valve ball seat between the valve body and joint of the valve cap and the valve ball.

There may also be a limiting slot at the bottom of the valve ball. The upper part of the rotating shaft is placed in the limiting slot and is fitted in the plane, and the lower part of the rotating shaft is threaded with the exhausting hole.

The structure described above has the advantage that, since the bottom of the valve ball is fixedly extended into the rotating shaft of the exhaust hole, when the valve ball is opened, the valve ball drives the rotating shaft to descend through the central bore of the sealing filler into the bonnet exhaust hole of the sealing bonnet (i.e., closing the exhaust hole ensures that a gas or liquid does not leak). When the valve ball is closed, the valve ball raises the rotating shaft, such that the gas or liquid in the chamber can flow through the valve ball hole and out of the exhaust hole of the rotating shaft and valve cap to relieve the pressure. Therefore, the valve ball valve has an elegantly intuitive structure that automatically opens and closes the exhaust hole with the rotation of the ball valve to relieve pressure and extend the service life of the valve.

BRIEF DESCRIPTION OF THE DRAWINGS

Each of the drawing figures now described shows an exemplary embodiment of the present invention.

DETAILED DESCRIPTION OF THE PREFERRED EMBODIMENTS

The present invention may be used with any type of valve and is particularly suited for use with high pressure systems.

Figure 1:
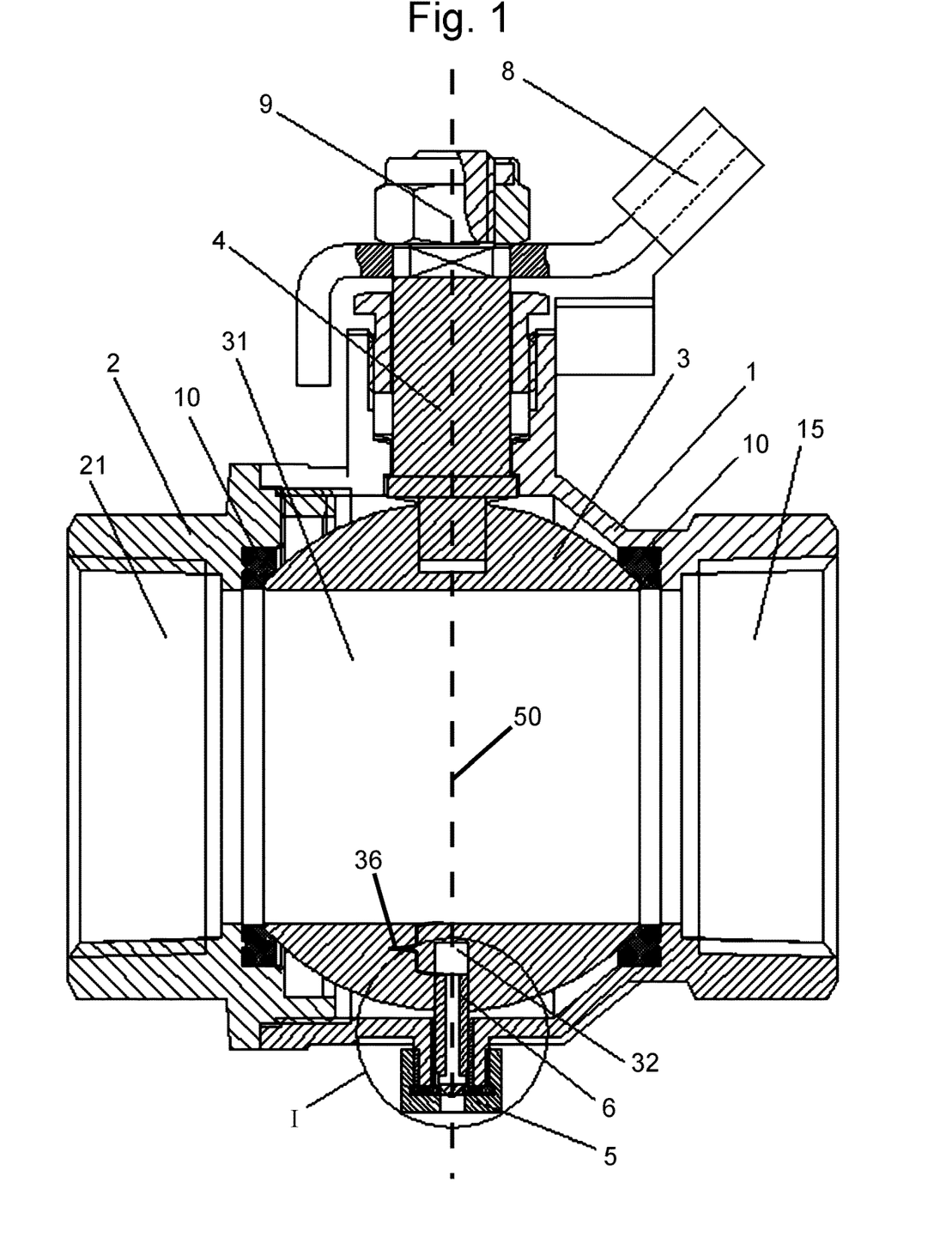
FIG. 1 is an elevational cross-sectional view of a valve in an open configuration.
Figure 2:
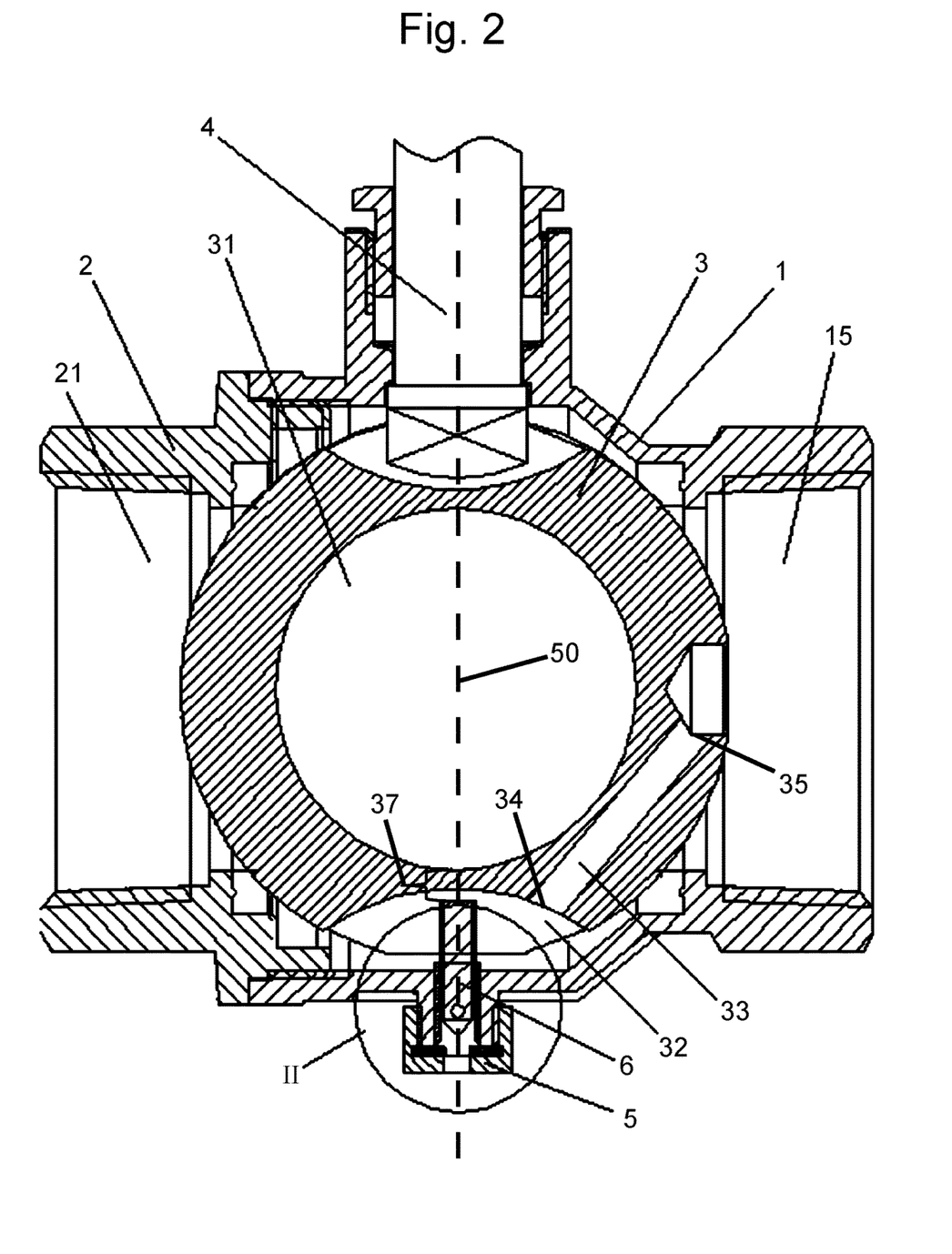
FIG. 2 is an elevational cross-sectional view of a valve in a closed configuration.
Figure 3:
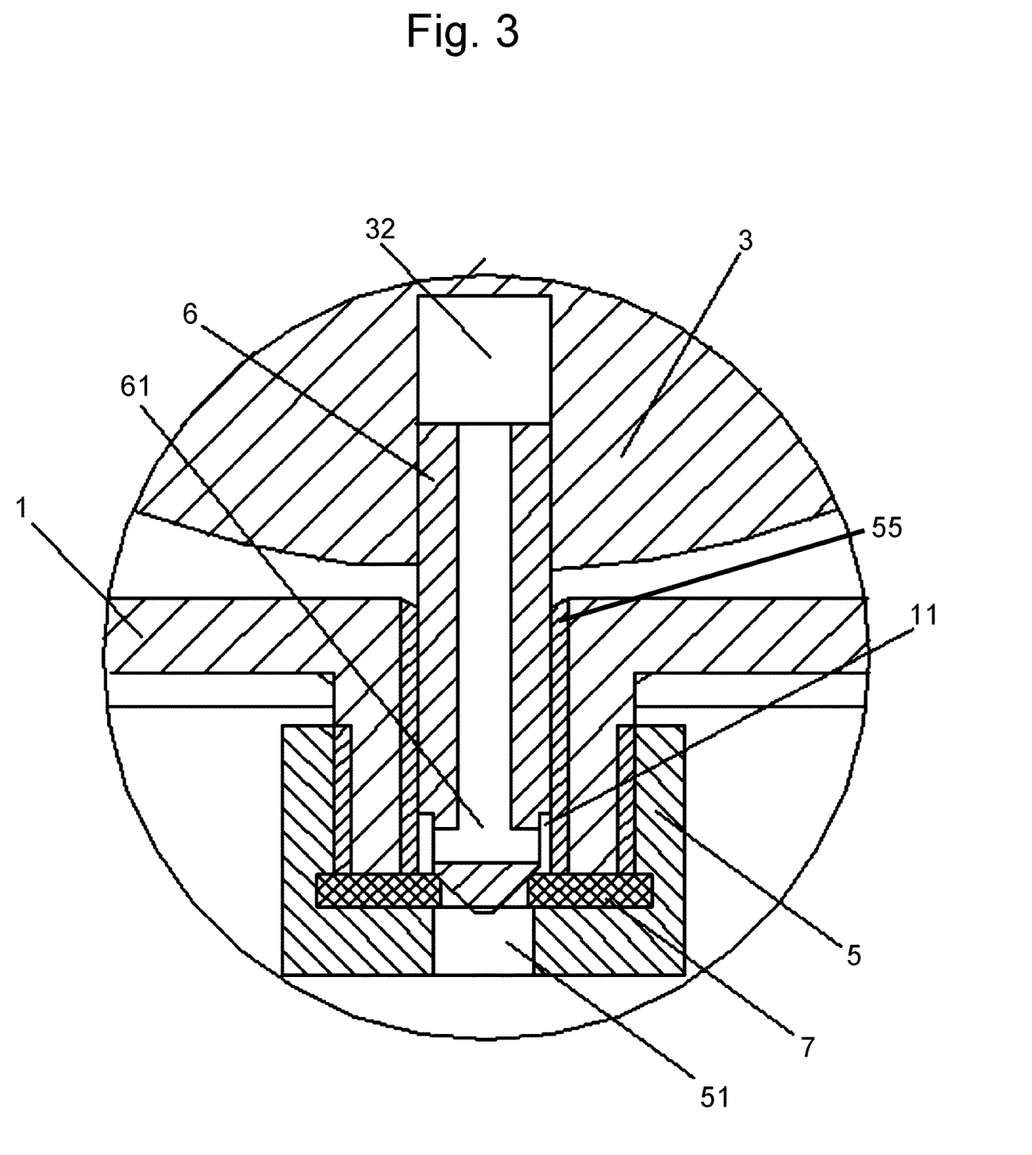
FIG. 3 is an enlarged view of part I of FIG. 1.

FIGS. 1, 2, 3, and 4 show a high pressure auto drain ball valve with a valve body 1 (or body), a valve cap 2 (or cap), a valve ball 3 (or ball) with a flow hole 31 (or flowthrough hole), and a valve stem 4 (or stem) wherein the valve cap 2 is fix to the end of the valve body 1 to form a chamber that contains the valve ball 3. The valve ball 3 can rotate about an axis of rotation 50 (vertically up and down in FIGS. 1 and 2). The valve stem 4 is rotatably connected to the valve body 1 that has an end fixed to the valve ball 3. In one embodiment, there is a first flow hole 15 (or first circulation hole) on the valve body 1 and a second flow hole 21 (or second circulation hole) on the valve cap 2. As shown in FIG. 3, there is also an exhausting hole 11 (or exhaust port) on the valve body 1. The end of the exhausting hole 11 is fixed with the sealing valve cap 5 (or plug) that includes an exhausting hole 51 (or vent hole). There is a sealing ring 7 with a center hole between the sealing valve cap 5 and the end of the exhausting hole 11. There is a valve ball hole 33 on the valve ball 3 which can connect with the first or second flow holes (15, 21). The valve ball hole 33 has a first end 34 proximate to the cavity (or limiting slot) 32 and a second end 35 distant from the cavity 32. When the valve is in the closed configuration, the second end 35 of the valve ball hole 33 connects with the first or second flow holes (15, 21). There is a rotating shaft 6 (or needle) rotating with the valve ball 3 that is threaded with the threads 55 of the exhausting hole 11 (or exhaust port) at the bottom of the valve ball. There is an exhausting hole 61 at the outer circumference of the rotating shaft 6 which is connected to the chamber axially. Gas or fluid is able to pass through the needle and out of the exhausting hole 61 at the bottom of the needle.

FIG. 1 shows a valve in an open configuration where the flow hole 31 of the valve ball is aligned with the first and second flow holes (15, 21) to allow a fluid or gas to pass through the valve. FIG. 2 shows a valve in a closed configuration where the flow hole 31 is unaligned with the first and second flow holes (15, 21) such that the flow of fluid or gas through the valve is blocked.

Referring to FIGS. 1 and 2, the valve also includes a handle 8. The other end of the valve stem 4 extends out of the valve body 1 and is fixed to the handle 8 by a nut 9. The handle 8 can rotate the valve stem 4 and drive the valve ball 3 to rotate so as to open or close the valve ball 3.

Referring to FIGS. 1 and 2, the first flow hole 15 on the valve body 1 and the second flow hole 21 on the valve cap 2 both have internal threads to allow for convenient connection to pipelines or equipment on both sides. In other embodiments of the invention, the flow holes (15, 21) are smooth to facilitate other types of connections (e.g., soldering or welding).

Referring to FIGS. 1 and 2, there is a valve ball seat 10 (or ball seat) between (i) the valve body 1 and the valve ball 3 and (ii) the joint of the valve cap 2 and the valve ball 3 so as to prevent the valve ball 3 from slipping during rotation. The valve body 1, the valve cap 2, and the two ball seats 10 cooperate to form the chamber.

Referring to FIGS. 1 and 2, there is a cavity or limiting slot 32 at the bottom of the valve ball 3. The upper part of the rotating shaft 6 is placed in the limiting slot 3 and is fitted in the plane, and the lower part is threaded with the exhausting hole 11. The section of the upper part of the valve ball 3 is quadrilateral, and the two opposite surfaces cooperate with the two side walls of the limiting slot 32 to drive the rotating shaft 6 to rotate without restricting the lifting movement of the rotating shaft 6. Due to the shape of the cavity 32 (or limiting slot), the rotating shaft 6 is rotationally locked to the valve ball, and the rotating shaft rotates when the valve ball rotates. The threading of the exhaust port causes the rotating shaft 6 (or needle) to move up or down relative to the ball as the ball and shaft rotate together. As shown in FIGS. 1 and 2, the axis of rotation 50 of the valve ball 3 passes through the rotating shaft 6. Due to the up and down movement of the rotating shaft 6, when the valve is in the open configuration (shown in FIG. 1), the rotating shaft 6 is a first distance 36 from the flow hole 31, and when the valve is in the closed configuration (shown in FIG. 2), the rotating shaft 6 is a second distance 37 from the flow hole 31. The second distance 37 is less than the first distance 36.

When the valve is used (i.e., to allow liquid or gas to pass through the valve), as shown in FIGS. 1 and 3, the valve ball 3 is rotated by the handle 8 to a position where the flow hole 31 of the valve ball 3 connects to the first flow hole 15 on the valve body 1 to the second flow hole 21 on the cap 2 to form a passage through which gas or liquid can flow to open the ball valve 3.

When the valve ball 3 is opened, the valve ball 3 drives the rotating shaft 6 to rotate. As the lower end of the rotating shaft 6 and the exhausting hole 11 are connected by threading 55, the rotating shaft 6 falls through the central hole of the sealing ring 7 and inserts the exhausting hole 51 of the sealing valve cap 5 to close the exhausting hole 11 so as to avoid gas or liquid leakage. As shown in FIG. 3, when the valve is in the open configuration, the rotating shaft 6 directly contacts the sealing ring 7.

Figure 4:
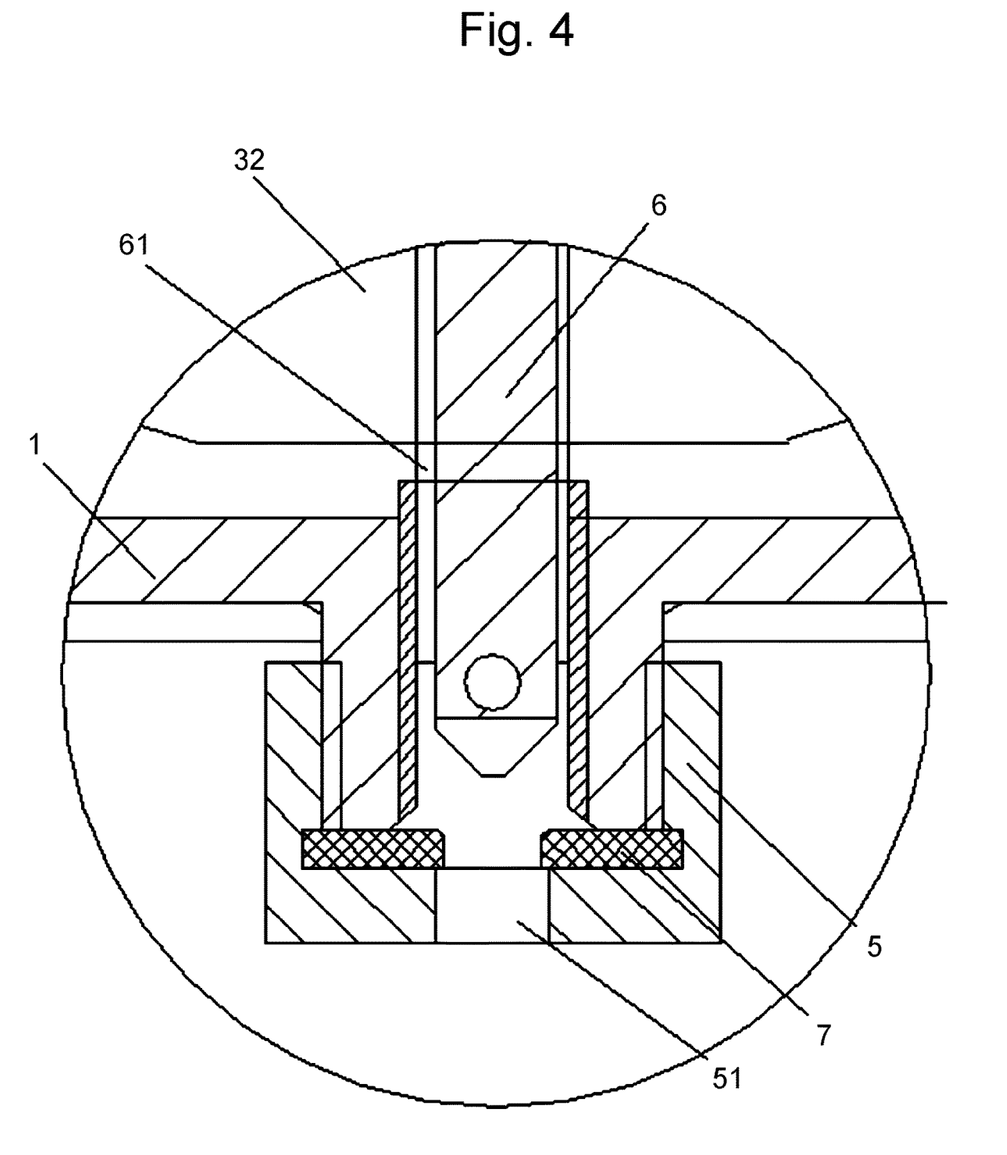
FIG. 4 is an enlarged view of part II in FIG. 2.

Referring to FIGS. 2 and 4, when the valve ball 3 is closed, the handle 8 drives the valve ball 3 to rotate, disconnecting the connection between the first flow hole 15 on the valve body 1 and the second flow hole 21 on the cap 2. At the same time, the valve ball 3 drives the rotating shaft 6 to rotate, the rotating shaft 6 rises, and the gas or liquid in the chamber can flow through the exhausting hole 33 of the shaft and flow out from the exhausting hole 51 of the cap to relieve pressure. Therefore, the device has an intuitive structure and the exhaust hole 11 (or exhaust port) can open or close automatically with the rotation of the valve ball 3. By draining the gas or liquid, the pipe pressure is relieved, and the life of the ball valve is prolonged. As shown in FIG. 4, when the valve is in the closed configuration, the rotating shaft 6 is separated from the sealing ring 7 of the exhaust port.

Figure 5:
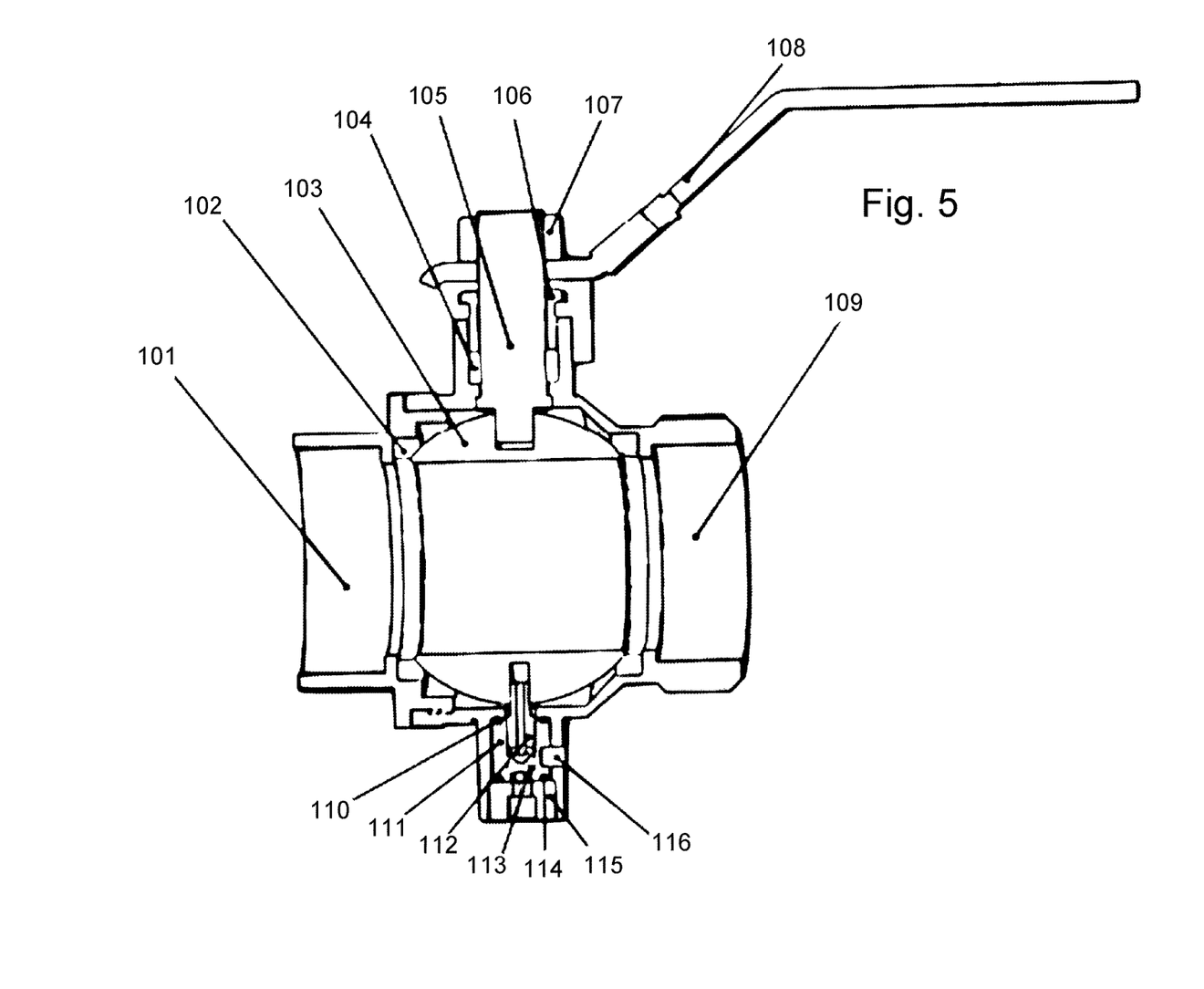
FIG. 5 is an elevational cross-sectional view of a valve in an open configuration.

FIG. 5 shows a second embodiment of the valve shown in FIGS. 1-4. The components of the valve, and their exemplary materials, are shown in the following table.

| Item | Name | Material |
| --- | --- | --- |
| 101 | Cap | Brass |
| 102 | Ball Seats | PTFE (Polytetrafluoroethylene) |
| 103 | Ball | Brass |
| 104 | Packing | PTFE |

-continued

| Item | Name | Material |
|---|---|---|
| 105 | Stem | Brass |
| 106 | Packing Nut | Brass |
| 107 | Nut | Steel |
| 108 | Handle | Steel |
| 109 | Body | Brass |
| 110 | O-Ring | Rubber |
| 111 | Needle Seat | Brass |
| 112 | Needle | Brass |
| 113 | Needle Sealing | PTFE |
| 114 | O-Ring | Rubber |
| 115 | Plug | Brass |
| 116 | Locking Pin | Steel |

Figure 6:
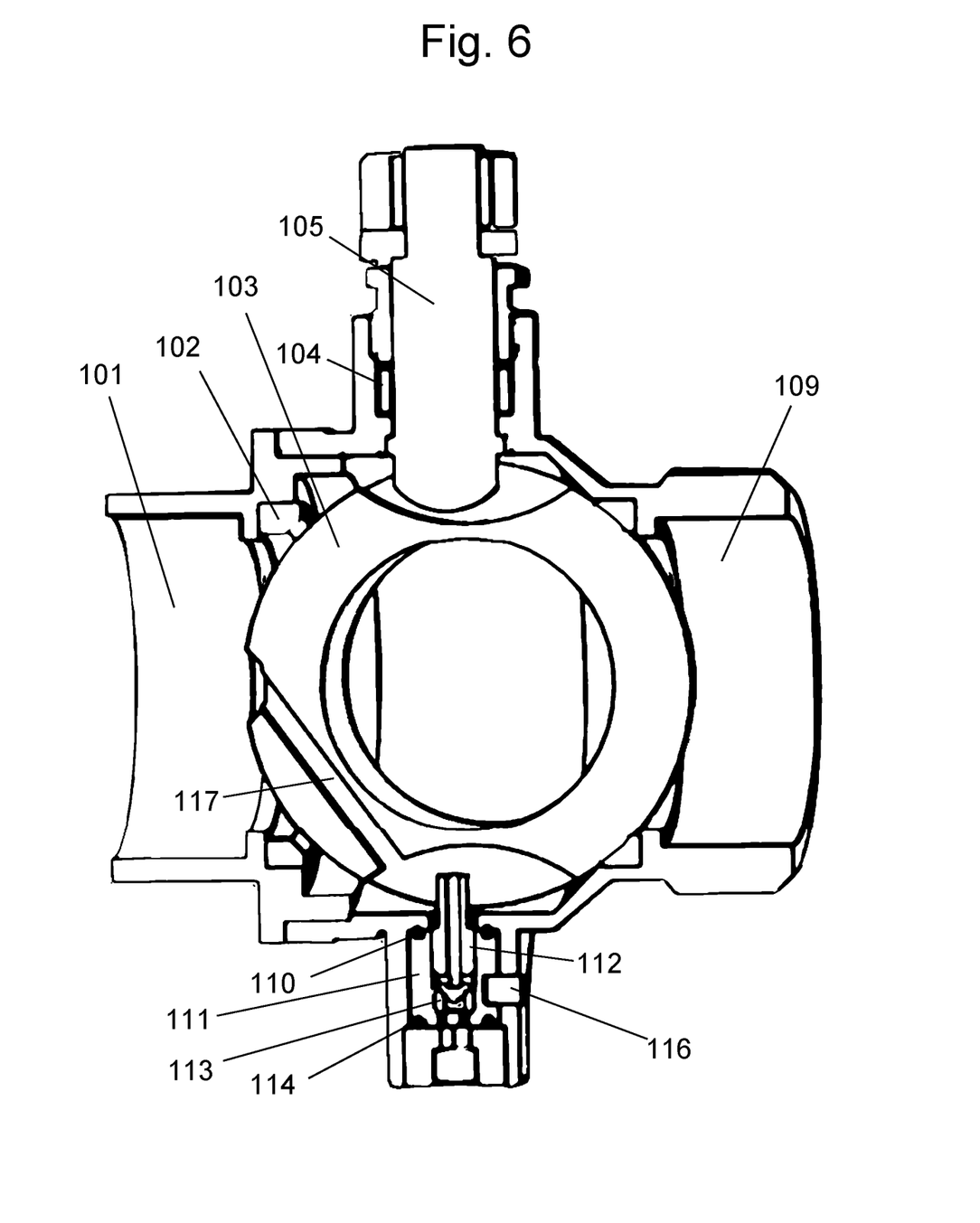
FIG. 6 is an elevational cross-sectional view of a valve in a closed configuration.

FIG. 6 shows the valve of FIG. 5 in the closed configuration. The names of the components listed in the table associated with FIGS. 5 and 6 may be used interchangeably with the component names used in FIGS. 1-4. For example, needle 112 may be used interchangeably with rotating shaft 6, and needle sealing 113 may be used interchangeably with sealing ring 7.

In the valve shown in FIGS. 5 and 6, the ball 103 is rotatable by 90 degree through the valve stem 106 for valve's fully opening (FIG. 5) and closing (FIG. 6). The exhaust channel 117 or tube goes though the ball 103 from one side to the bottom of the ball 103. The residual air on the down-stream side (101 in FIG. 6) can automatically and continuously be vented though the channel 117. The valve includes a stop valve (collectively items 110-116) to close the bottom exhaust port when the valve is in the open position and open the exhaust port when the ball valve is at closed position. When the stem 106 and the ball 103 are 90 degree clockwise turned for ball valve's closing, the needle 102 of the stop valve is turned counterclockwise to open the stop valve accordingly.

Figure 8:
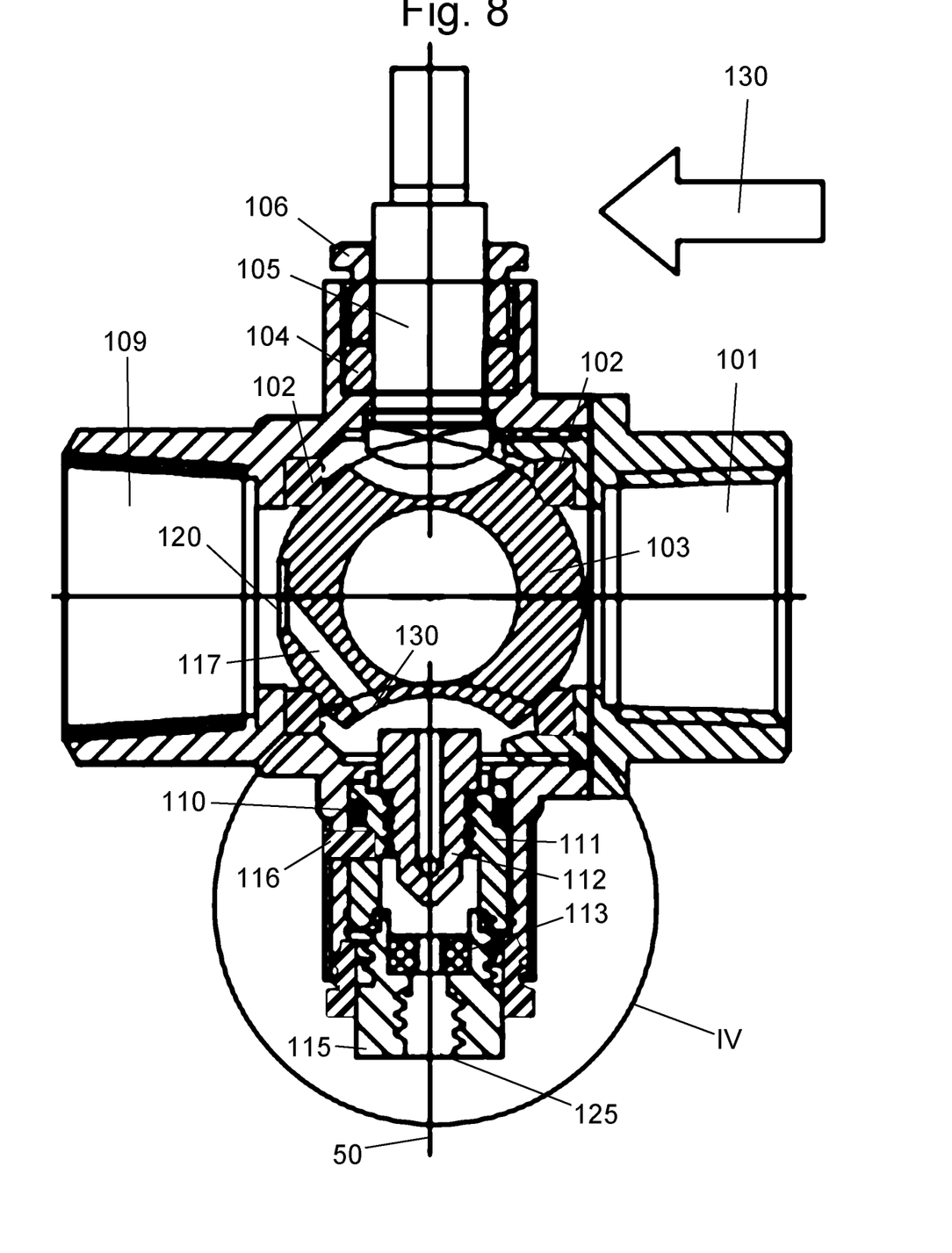
FIG. 8 is an elevational cross-sectional view of a valve in a closed configuration.
Figure 9:
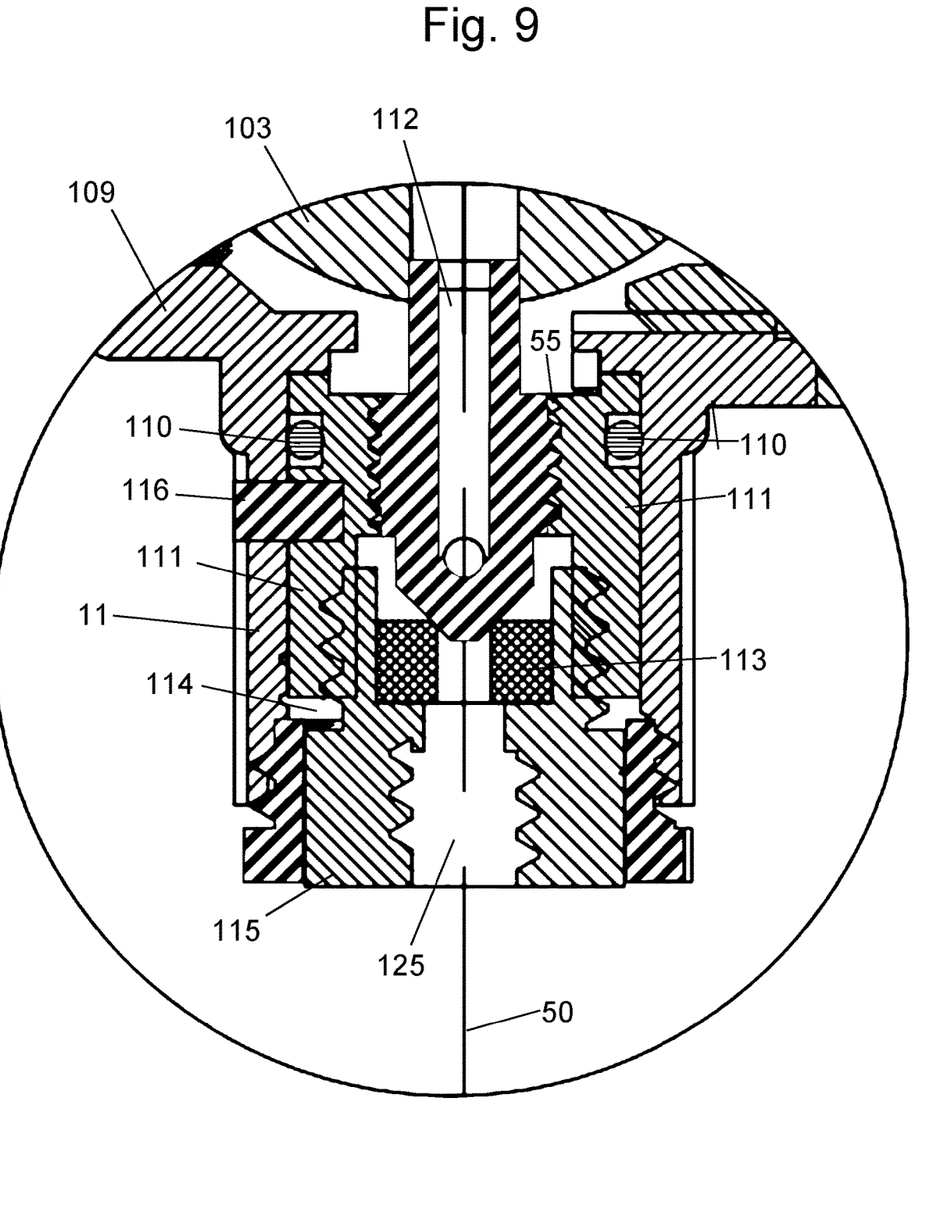
FIG. 9 is an enlarged view of part III of FIG. 7.
Figure 10:
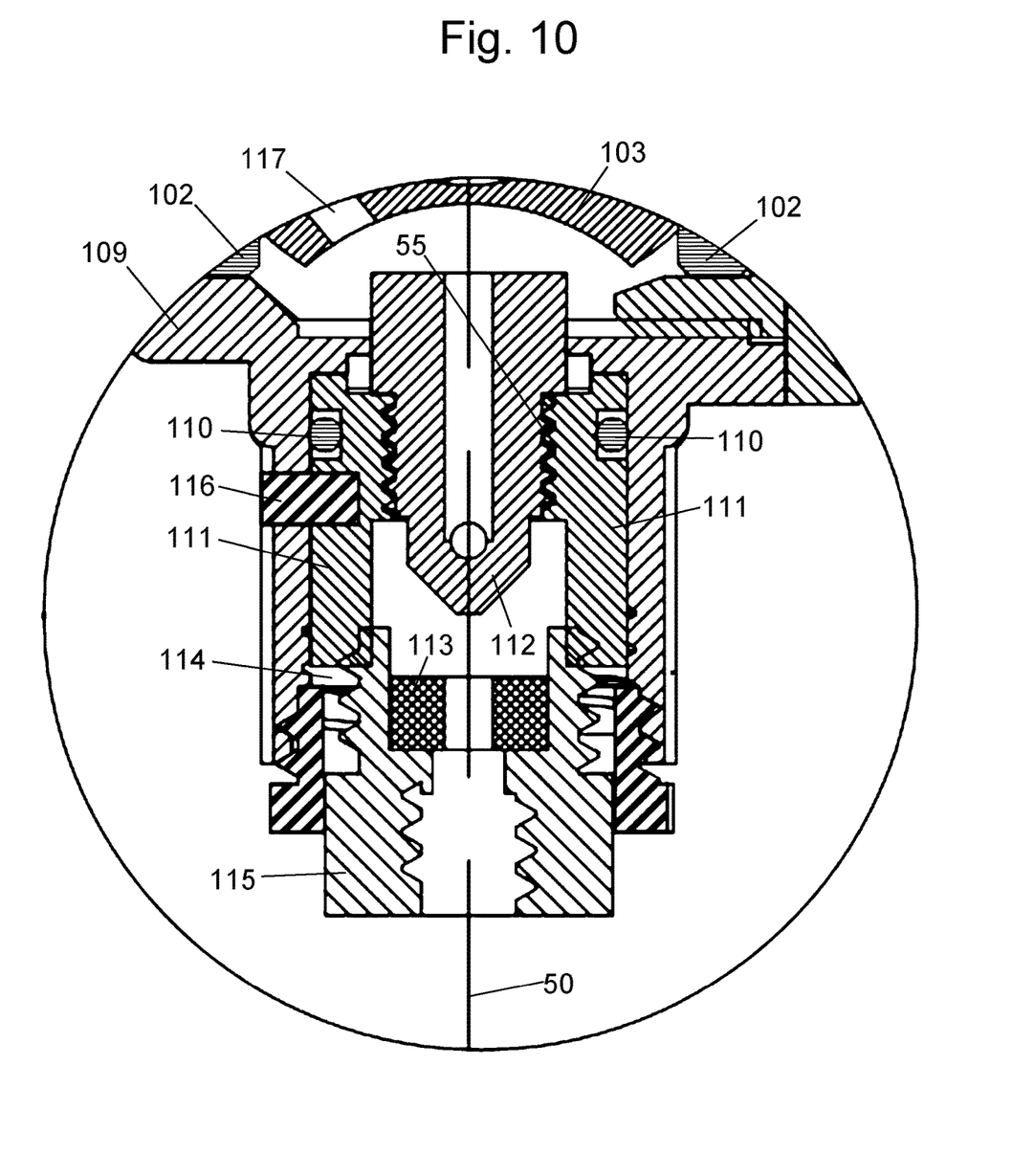
FIG. 10 is an enlarged view of part IV of FIG. 8.

When the handle turns the ball 103 (or ball valve) in the closed state (FIG. 8), the built-in needle valve opens. The needle valve stem 112 moves upward, and the gas enters the valve cavity from the small hole 120 on the ball 103 and exits the valve body through the needle valve hole 125. The small hole 120 is at a first end of the exhaust channel 117. A second end 130 of the channel 117 is located adjacent to the exhaust port.

Figure 7:
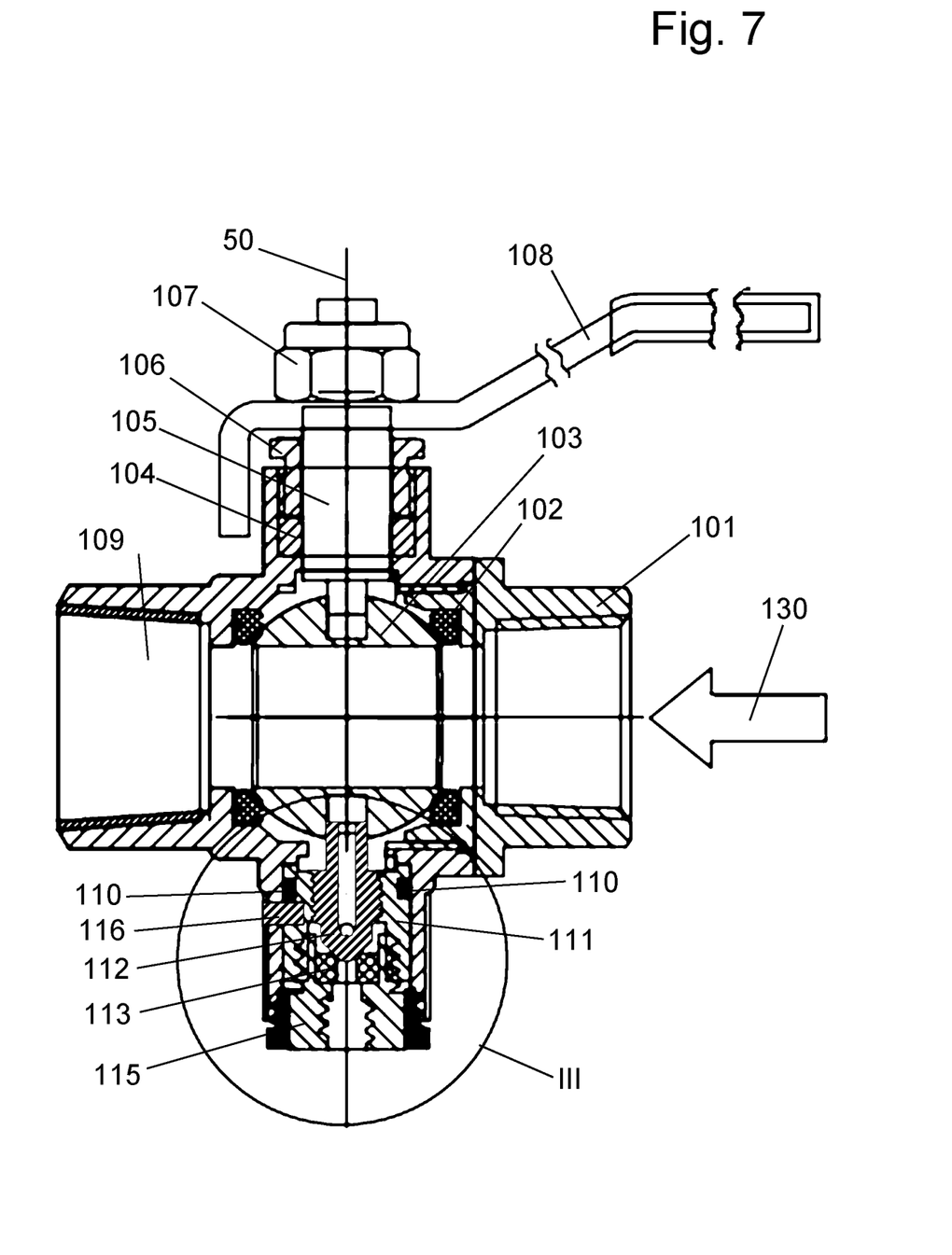
FIG. 7 is an elevational cross-sectional view of a valve in an open configuration.

When the handle turns the ball 103 (or ball valve) in the open state (FIG. 7), the fluid is allowed to flow in a direction 130 through the valve, and the needle valve stem 112 moves down and causes the needle valve hole 125 to close, preventing gas from leaking outside of the valve body.

The valve with automatic exhaust function includes an exhaust port (I, II, III, IV in FIGS. 1, 2, 7, and 8) with a needle valve at the bottom of the ball. The stem 112 of the needle valve moves up and down with the rotation of the ball. When the ball 103 (or ball valve) is in a fully open position, the needle valve 112 moves down and the needle valve hole 125 is then closed. When the ball 103 (or ball valve) is in the closed state, the needle valve stem 112 moves upward, such that the ball 103 relief hole 120 communicates with the needle valve hole 125 to achieve the automatic exhaust function.

While the principles of the invention have been shown and described in connection with specific embodiments, it is to be understood that such embodiments are by way of example and are not limiting. Consequently, variations and modifications commensurate with the above teachings, and with the skill and knowledge of the relevant art, are within the scope of the present invention. The embodiments described herein are intended to illustrate best modes known of practicing the invention and to enable others skilled in the art to utilize the invention with various modifications required by the particular application(s) or use(s) of the present invention. It is intended that the appended claims be construed to include alternative embodiments to the extent permitted by the prior art.

I claim:

1. An auto-drain ball valve comprising:
   a body with
      a first circulation hole and
      an exhaust port with a threading;
   a cap with a second circulation hole;
   the body
      secured to the cap and
      cooperating with the cap to form a chamber;
   a ball
      secured in the chamber,
      having a flowthrough hole,
      having a cavity located adjacent to the exhaust port, and
      having a channel extending through the ball with
         a first end of the channel proximate to the exhaust port and
         a second end of the channel distant from the exhaust port;
   a needle
      partially located within the cavity of the ball,
      rotationally locked to the ball, and
      connected to the threading of the exhaust port, wherein
         a threading is configured to move the needle further into or out of the cavity of the ball when the ball is rotated;
   the auto-drain ball valve having an open configuration wherein
      the first circulation hole of the body, the second circulation hole of the cap, and the flowthrough hole of the ball are aligned to enable a fluid or gas to flow between the first and second circulation holes,
      the needle seals the exhaust port to prevent the fluid or gas from passing through the exhaust port, and
      the second end of the channel is distant from both the first circulation hole and the second circulation hole; and
   the auto-drain ball valve having a closed configuration wherein
      the flowthrough hole of the ball is unaligned with the first circulation hole of the body and the second circulation hole of the cap to prevent the fluid or gas from passing between the first and second circulation holes,
      the needle is disengaged from a portion of the exhaust port to enable the fluid or gas to pass through the exhaust port, and
      the second end of the channel is adjacent to either the first circulation hole or the second circulation hole to enable the fluid or gas in the chamber to vent from the chamber through the channel to the exhaust port.

2. The auto-drain ball valve of claim 1 further comprising
   a stem
      rotatably connected to the body and
      fixedly secured to the ball.

3. The auto-drain ball valve of claim 2 further comprising a handle secured to the stem with a nut.

4. The auto-drain ball valve of claim 1 further comprising a plug
   secured to the exhaust port,
   having a vent hole aligned with the exhaust port, and
   having a sealing ring adjacent to the exhaust port.

5. The auto-drain ball valve of claim 4 wherein
the needle
   directly contacts the sealing ring when the auto-drain ball valve is in the open configuration and
   is spaced apart from a sealing filler when the auto-drain ball valve is in the closed configuration.

6. The auto-drain ball valve of claim 1, wherein
both
   the first circulation hole of the body and
   the second circulation hole of the cap
have internal threads configured to receive a pipe connection.

7. The auto-drain ball valve of claim 1, wherein
the ball includes a limiting groove adjacent to the needle configured to limit rotation of the ball.

8. The auto-drain ball valve of claim 1, wherein
the ball is configured to rotate about an axis of rotation from a first orientation when the auto-drain ball valve is in the open configuration to a second orientation when the auto-drain ball valve is in the closed configuration; and
the axis of rotation extends through the needle.

9. The auto-drain ball valve of claim 1, wherein
the needle is a first distance from the flowthrough hole when the auto-drain ball valve is in the open configuration;
the needle is a second distance from the flowthrough hole when the auto-drain ball valve is in the closed configuration; and
the second distance is greater than the first distance.

10. The auto-drain ball valve of claim 1 further comprising
a first ball seat adjacent to the first circulation hole;
a second ball seat adjacent to the second circulation hole; wherein
the body, the cap, the first ball seat, and the second ball seat cooperate to form the chamber.

11. The auto-drain valve of claim 1 wherein
the exhaust port of the body includes a needle seat, and
the threading is located on the needle seat.

12. The auto-drain ball valve of claim 1 wherein
in the closed configuration, a needle sealing is the portion of the exhaust port that the needle is disengaged from.

13. An auto-drain ball valve, comprising:
a body with
   a first circulation hole and
   an exhaust port;
a cap with a second circulation hole;
the body
   secured to the cap and
   cooperating with the cap to form a chamber;
the ball
   secured in the chamber,
   having a flowthrough hole,
   having a cavity located adjacent to the exhaust port, and
   having a channel extending through a ball with
      a first end of the channel proximate to the cavity and
      a second end of the channel distant from the cavity;
a needle
   partially located within the cavity of the ball,
   rotationally locked to the ball,
   connected to a threading of the exhaust port, and
   configured to move further into or out of the cavity of the ball when the ball is rotated;
the auto-drain ball valve having an open configuration wherein
   the first circulation hole of the body, the second circulation hole of the cap, and the flowthrough hole of the ball are aligned to enable a fluid or gas to flow through the auto-drain ball valve,
   the needle seals the exhaust port to prevent the fluid or gas from passing through the exhaust port, and
   the second end of the channel is distant from both the first circulation hole and the second circulation hole; and
the auto-drain ball valve having a closed configuration wherein
   the flowthrough hole of the ball is unaligned with the first circulation hole of the body and the second circulation hole of the cap to prevent the fluid or gas from flowing through the first and second circulation holes,
   the needle is disengaged from a portion of the exhaust port to enable the fluid or gas to pass through the exhaust port, and
   the second end of the channel is adjacent to either the first circulation hole or the second circulation hole to enable fluid or gas in the chamber to vent from the chamber through the channel to the exhaust port.

14. The auto-drain ball valve of claim 13 further comprising
a stem
   rotatably connected to the body and
   fixedly secured to the ball.

15. The auto-drain ball valve of claim 14 further comprising
a handle secured to the stem with a nut.

16. The auto-drain ball valve of claim 13 further comprising
a plug
   secured to the exhaust port,
   having a vent hole aligned with the exhaust port, and
   having a sealing ring adjacent to the exhaust port.

17. The auto-drain ball valve of claim 16 wherein
the needle
   directly contacts the sealing ring when the auto-drain ball valve is in the open configuration and
   is spaced apart from a sealing filler when the auto-drain ball valve is in the closed configuration.

18. The auto-drain ball valve of claim 13, wherein
both
   the first circulation hole of the body and
   the second circulation hole of the cap
have internal threads configured to receive a pipe connection.

19. The auto-drain ball valve of claim 13, wherein
the ball includes a limiting groove adjacent to the needle configured to limit rotation of the ball.

20. The auto-drain ball valve of claim 13, wherein
the ball is configured to rotate about an axis of rotation from a first orientation when the auto-drain ball valve is in the open configuration to a second orientation when the auto-drain ball valve is in the closed configuration; and
the axis of rotation extends through the needle.

21. The auto-drain ball valve of claim 13, wherein
the needle is a first distance from the flowthrough hole when the auto-drain ball valve is in the open configuration;
the needle is a second distance from the flowthrough hole when the auto-drain ball valve is in the closed configuration; and
the second distance is greater than the first distance.

22. The auto-drain ball valve of claim 13 further comprising
   a first ball seat adjacent to the first circulation hole;
   a second ball seat adjacent to the second circulation hole;
   wherein
   the body, the cap, the first ball seat, and the second ball seat cooperate to form the chamber.

\* \* \* \* \*